US010311107B2

(12) United States Patent
Roy-Faderman et al.

(10) Patent No.: US 10,311,107 B2
(45) Date of Patent: Jun. 4, 2019

(54) TECHNIQUES AND ARCHITECTURES FOR PROVIDING REFERENCES TO CUSTOM METAMETADATA IN DECLARATIVE VALIDATIONS

(71) Applicant: salesforce.com, inc., San Francisco, CA (US)

(72) Inventors: Avrom Roy-Faderman, Sunnyvale, CA (US); Carolyn Leigh Grabill, San Francisco, CA (US); Seth Leger, Cary, NC (US); Bryan Yan, Fremont, CA (US); Mason Everett, San Francisco, CA (US); Vladimir Gerasimov, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/140,451

(22) Filed: Sep. 24, 2018

(65) Prior Publication Data

US 2019/0026392 A1 Jan. 24, 2019

Related U.S. Application Data

(63) Continuation-in-part of application No. 13/933,776, filed on Jul. 2, 2013, now Pat. No. 10,146,510.

(60) Provisional application No. 61/667,345, filed on Jul. 2, 2012, provisional application No. 61/667,808, filed on Jul. 3, 2012.

(51) Int. Cl.

| | |
|---|---|
| ***G06F 9/44*** | (2018.01) |
| ***G06F 16/907*** | (2019.01) |
| ***G06F 16/25*** | (2019.01) |

(52) U.S. Cl.
CPC .......... *G06F 16/907* (2019.01); *G06F 16/252* (2019.01); *G06F 16/258* (2019.01)

(58) Field of Classification Search
CPC ........................................................ G06F 9/44
USPC ................................................ 717/100–108
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |

(Continued)

OTHER PUBLICATIONS

Final Office Action for U.S. Appl. No. 13/933,776 dated Dec. 29, 2017, 17 pages.

(Continued)

*Primary Examiner* — Jae U Jeon
(74) *Attorney, Agent, or Firm* — Jaffrey, Watson, Mendonsa & Hamilton, LLP

(57) ABSTRACT

A definition of a custom object specifying a custom format for metadata is received within a database system where creation of the metadata is required to comply with the custom format specified within the custom object with the metadata is associated with the custom object. At least a portion of the metadata refers to another custom metadata object type. The custom object having the definition is stored within the database system. A database record is created utilizing the custom object with reference to the another custom metadata object type. At least one aspect of an application is defined utilizing the database system using the metadata of the record.

15 Claims, 10 Drawing Sheets

CUSTOM METAMETADATA 860
850 COMPILE-TIME DEPENDENCY
PROCEDURAL CODE 840
APEX
API INTEGRATION
870 DEFINES
INTERFACE 830
DYNAMIC TRIGGER 832
LUMEN COMPONENT 834
VF DYNAMIC PAGE 836
INTEGRATED UI 838
METADATA 825
ORG DATA 820
USER ACTION 800

(56) References Cited

U.S. PATENT DOCUMENTS 5,819,038 A 10/1998 Carleton et al.
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
6,092,083 A 7/2000 Brodersen et al.
6,151,584 A 11/2000 Papierniak et al.
6,169,534 B1 1/2001 Raffel et al.
6,178,425 B1 1/2001 Brodersen et al.
6,189,011 B1 2/2001 Lim et al.
6,216,135 B1 4/2001 Brodersen et al.
6,233,617 B1 5/2001 Rothwein et al.
6,266,669 B1 7/2001 Brodersen et al.
6,295,530 B1 9/2001 Ritchie et al.
6,324,568 B1 11/2001 Diec
6,324,693 B1 11/2001 Brodersen et al.
6,336,137 B1 1/2002 Lee et al.
D454,139 S 3/2002 Feldcamp
6,367,077 B1 4/2002 Brodersen et al.
6,393,605 B1 5/2002 Loomans
6,405,220 B1 6/2002 Brodersen et al.
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans
6,732,095 B1 5/2004 Warshaysky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker et al.
6,829,655 B1 12/2004 Huang et al.
6,842,748 B1 1/2005 Warner et al.
6,850,895 B2 2/2005 Brodersen et al.
6,850,949 B2 2/2005 Warner et al.
7,289,976 B2 10/2007 Kihneman et al.
7,340,411 B2 3/2008 Cook
7,464,366 B2 12/2008 Shukla et al.
7,519,976 B2 4/2009 Blevins
7,620,655 B2 11/2009 Larsson et al.
7,640,533 B1 12/2009 Lottero et al.
7,802,230 B1 9/2010 Mendicino et al.
7,926,030 B1 4/2011 Harmon
8,069,437 B2 11/2011 Aigner et al.
8,769,704 B2 7/2014 Peddada et al.
8,799,233 B2 8/2014 Brooks et al.
9,269,060 B2 2/2016 Maes
2001/0044791 A1 11/2001 Richter et al.
2002/0022986 A1 2/2002 Coker et al.
2002/0029161 A1 3/2002 Brodersen et al.
2002/0029376 A1 3/2002 Ambrose et al.
2002/0035577 A1 3/2002 Brodersen et al.
2002/0042264 A1 4/2002 Kim
2002/0042843 A1 4/2002 Diec
2002/0072951 A1 6/2002 Lee et al.
2002/0082892 A1 6/2002 Raffel et al.
2002/0129352 A1 9/2002 Brodersen et al.
2002/0140731 A1 10/2002 Subramaniam et al.
2002/0143997 A1 10/2002 Huang et al.
2002/0152102 A1 10/2002 Brodersen et al.
2002/0161734 A1 10/2002 Stauber et al.
2002/0162090 A1 10/2002 Parnell et al.
2002/0165742 A1 11/2002 Robins
2003/0004971 A1 1/2003 Gong et al.
2003/0018705 A1 1/2003 Chen et al.
2003/0018830 A1 1/2003 Chen et al.
2003/0041159 A1* 2/2003 Tinsley .................. G06F 9/451 709/231
2003/0066031 A1 4/2003 Laane
2003/0066032 A1 4/2003 Ramachadran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker
2003/0088545 A1 5/2003 Subramaniam et al.
2003/0120675 A1 6/2003 Stauber et al.
2003/0151633 A1 8/2003 George et al.
2003/0159136 A1 8/2003 Huang et al.
2003/0187921 A1 10/2003 Diec
2003/0189600 A1 10/2003 Gune et al.
2003/0191743 A1 10/2003 Brodersen et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan, Jr. et al.
2004/0199489 A1 10/2004 Barnes-Leon et al.
2004/0199536 A1 10/2004 Barnes-Leon et al.
2004/0199543 A1 10/2004 Braud et al.
2004/0249854 A1 12/2004 Barnes-Leon et al.
2004/0260534 A1 12/2004 Pak et al.
2004/0260595 A1 12/2004 Chessell et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2005/0187930 A1 8/2005 Subramanian et al.
2005/0223022 A1 10/2005 Weissman et al.
2006/0074736 A1 4/2006 Shukla et al.
2007/0168935 A1 7/2007 Ogami et al.
2007/0168962 A1 7/2007 Heinke et al.
2007/0201654 A1 8/2007 Shenfield
2008/0086495 A1 4/2008 Kiziltunc et al.
2008/0195936 A1 8/2008 White et al.
2009/0119255 A1 5/2009 Frank et al.
2009/0177744 A1 7/2009 Marlow et al.
2009/0205013 A1 8/2009 Lowes
2010/0161682 A1 6/2010 Pfeifer et al.
2011/0107243 A1 5/2011 Jain et al.
2011/0265020 A1 10/2011 Fields et al.
2011/0282899 A1 11/2011 Mathew et al.
2012/0066755 A1 3/2012 Peddada et al.
2012/0089610 A1* 4/2012 Agrawal ................ G06Q 10/00 707/741
2012/0096521 A1 4/2012 Peddada
2012/0110020 A1 5/2012 Weissman et al.
2012/0110566 A1 5/2012 Park
2012/0166976 A1 6/2012 Rauh et al.
2012/0174013 A1 7/2012 Kraus et al.
2012/0223951 A1 9/2012 Dunn et al.
2012/0233186 A1 9/2012 Hammer
2012/0239629 A1 9/2012 Brooks et al.
2012/0246120 A1 9/2012 Brooks et al.
2012/0304307 A1 11/2012 Ramesh et al.

(56) References Cited

U.S. PATENT DOCUMENTS

| | | | | |
|---|---|---|---|---|
| 2012/0323860 | A1 | 12/2012 | Yasa et al. | |
| 2013/0055118 | A1 | 2/2013 | Donovan et al. | |
| 2013/0055201 | A1 | 2/2013 | No et al. | |
| 2013/0073568 | A1 * | 3/2013 | Federov | G06Q 50/01 707/749 |
| 2013/0117291 | A1 | 5/2013 | Roy-Faderman | |
| 2013/0218911 | A1 | 8/2013 | Li et al. | |
| 2013/0304713 | A1 | 11/2013 | Roy-Faderman | |

OTHER PUBLICATIONS

Final Office Action for U.S. Appl. No. 13/933,776 dated Feb. 27, 2017, 13 pages.
Final Office Action for U.S. Appl. No. 13/933,776 dated May 5, 2016, 12 pages.
Final Office Action for U.S. Appl. No. 13/934,550 dated Jul. 27, 2018, 13 pages.
Final Office Action for U.S. Appl. No. 13/934,550 dated Nov. 20, 2015, 12 pages.
Final Office Action for U.S. Appl. No. 13/934,550 dated Nov. 3, 2016, 12 pages.
Non-Final Office Action for U.S. Appl. No. 13/933,776 dated Jul. 13, 2017, 16 pages.
Non-Final Office Action for U.S. Appl. No. 13/933,776 dated Jul. 30, 2015, 18 pages.
Non-Final Office Action for U.S. Appl. No. 13/933,776 dated Oct. 6, 2016, 11 pages.
Non-Final Office Action for U.S. Appl. No. 13/934,550 dated Jan. 3, 2018, 15 pages.
Non-Final Office Action for U.S. Appl. No. 13/934,550 dated Jun. 22, 2015, 15 pages.
Non-Final Office Action for U.S. Appl. No. 13/934,550 dated May 6, 2016, 12 pages.
Notice of Allowance for U.S. Appl. No. 13/933,776 dated Jul. 9, 2018, 15 pages.

* cited by examiner

TECHNIQUES AND ARCHITECTURES FOR PROVIDING REFERENCES TO CUSTOM METAMETADATA IN DECLARATIVE VALIDATIONS

CLAIM OF PRIORITY

This continuation-in-part application claims priority to U.S. patent application Ser. No. 13/933,776 entitled "Custom Metametadata with Packagable Records", filed Jul. 2, 2013, which further claims priority to U.S. Provisional Patent Application No. 61/667,345 entitled "Custom Metametadata with Packagable Records", filed Jul. 2, 2012 and U.S. Provisional Patent Application No. 61/667,808 entitled "Systems and Methods for an Extensible Framework to Expose Metametadata for Dynamically Generated UIs", filed Jul. 3, 2012, the entire contents of which are incorporated herein by reference.

TECHNICAL FIELD

Embodiments relate to techniques for managing server availability in a multi-server environment utilizing a single database node. More particularly, embodiments relate to techniques for more accurately monitoring and flagging service disruptions within a multi-server environment utilizing a single database node.

BACKGROUND

Conventionally, metadata has been used to describe data. The metadata, in some circumstances, can describe a format of the data, a type of the data, etc. However, techniques for defining metadata have generally exhibited various limitations. For example, the metadata itself has typically been incapable of being described by other metadata in a standard manner made available to third party developers of a platform maintaining the metadata. Accordingly, it is desirable to provide techniques to the third-party developers enabling a metadata format to be predefined for creating metadata for data in accordance with the predefined format.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Described herein are techniques and architectures to provide formula fields and validation rule formulas on custom and standard objects, which have references to custom metadata type records. As described in greater detail below with reference to the figures, this allows for a more sophisticated and consistent environment for users utilizing custom objects and/or custom metadata type records.

In one embodiment, custom metadata types support a special sort of relationship field, called a "Metadata Relationship." Whereas a regular relationship is between data records, a metadata relationship is between metadata components. In particular, a custom metadata type can have a metadata relationship with any of the following domains: Another custom metadata type (so a record of one type is related to a record of the other type); EntityDefinition (so a record is related to the metadata for a standard or custom entity); FieldDefinition (so a record is related to the metadata for a standard or custom field). This list of domains may be expanded.

In one embodiment, at the application program interface (API) level, these fields all act much like ordinary relationship fields (e.g., delete-restricted lookups for relationships between custom metadata types; external relationships for relationships between custom metadata types and Metadata Catalog entities). For relationships between custom metadata types, these are implemented as a form of lookup, but relationships to EntityDefinition and FieldDefinition are not implemented as an external lookup, because the external IDs of those entities (called "Durable IDs"), are subject to change in the future, whereas custom metadata is persisted in the database.

Instead, these relationships are implemented as custom EnumOrId fields, meaning that they can hold either a genuine database ID (to point to a custom entity or field) or an enum value (representing a standard entity or field). In one embodiment, these enum or id values are transformed into Metadata Catalog Durable IDs at query/join time at the API level.

If, for example, a user wishes to create validation formulas on custom metadata types, the structure described above cannot consistently function to traverse relationships with an EntityDefinition or FieldDefinition domain within the formula. Described herein are techniques and structures to traverse these relationship fields in validation formulas on custom metadata types as if they were ordinary relationships that used EntityDefinition or FieldDefinition as a domain.

Figure 1:
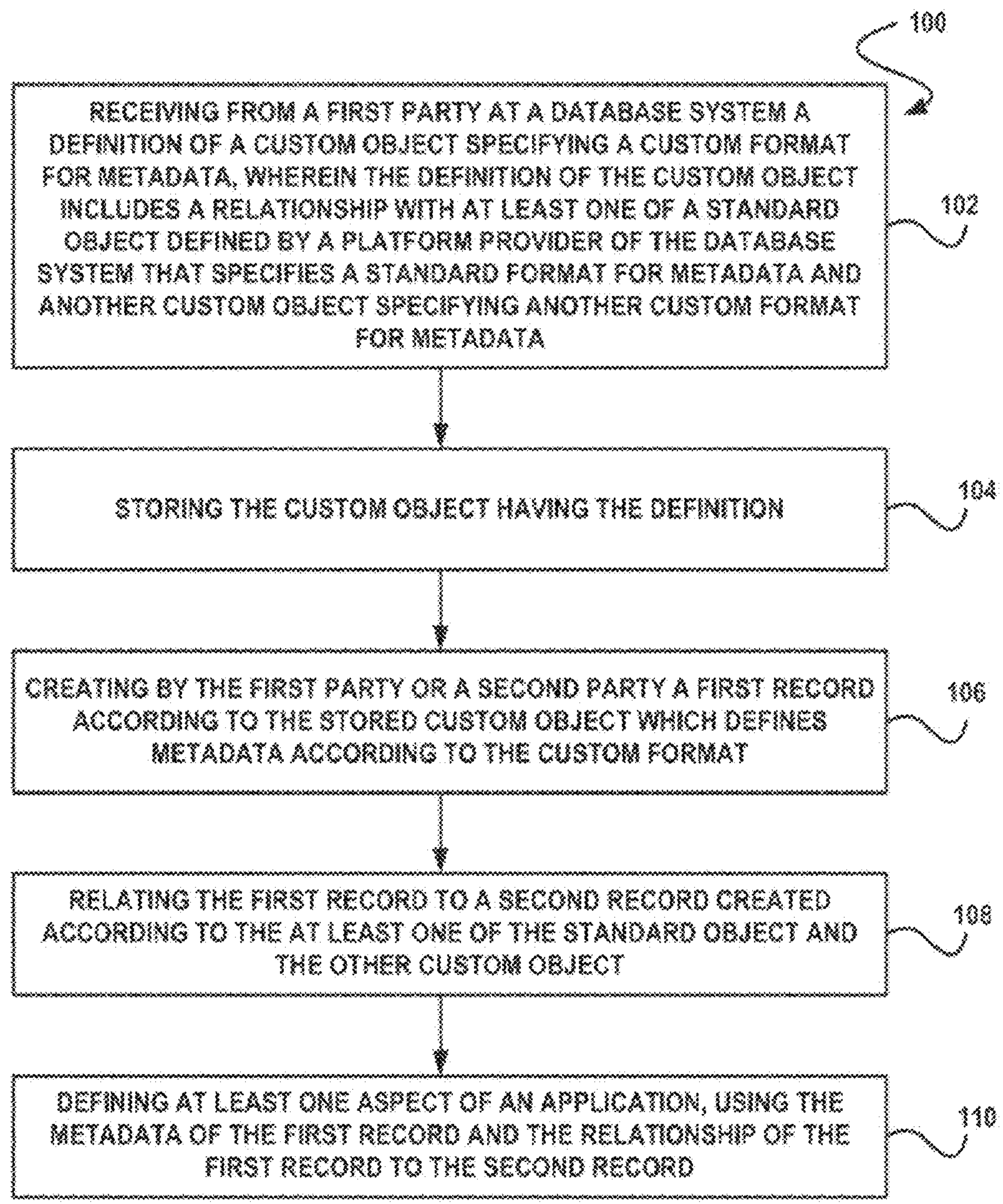
FIG. 1 is one embodiment of a technique for defining applications using metadata records created from an object specifying a predefined metadata format.

FIG. 1 is one embodiment of a technique for defining applications using metadata records created from an object specifying a predefined metadata format. As shown in operation 102, a definition of a custom object specifying a custom format for metadata is received from a first party at a database system, where the definition of the custom object includes a relationship with at least one of a standard object defined by a platform provider of the database system that specifies a standard format for metadata and another custom object specifying another custom format for metadata. In the context of the present description, the custom object may be any container capable of being defined for specifying the custom format for metadata and capable of being defined to include a relationship to the standard object and/or other custom object. For example, the custom object may be a record where the definition of the record includes data specifying the custom format of the metadata and further includes a reference to the standard object and/or other custom object.

Moreover, the metadata for which the custom format is specified by the custom object may be any descriptive data capable of being used to define at least one aspect of an application, as described in more detail below. It should be noted that the custom object may be defined in any manner that specifies the custom format for the metadata. In this way, the custom object may optionally specify the custom format that metadata is required to take. As a further option, only metadata created with reference to the custom object may be required to comply with the custom format specified by the custom object. Thus, different custom objects may be defined to specify different custom metadata formats, such that metadata referencing one of the custom objects is created in a custom format specified by that custom object.

In one exemplary embodiment, the definition of the custom object may specify the custom format by specifying fields of the metadata. Further, with respect to such embodiment, the definition of the custom object may specify the fields to be included in the metadata. Accordingly, where the metadata is formed using a record, the record may reference the custom object, and may further include the fields specified by the custom object along with customized values for those fields.

In another embodiment, the definition of the custom object may include the relationship with the standard object defined by the platform provider of the database system that specifies the standard format for metadata. For example, the standard object may specify the standard format for fields, tables, columns, pages, etc. In this way, metadata defined according to the standard format may be standard metadata such as table definitions, column definitions, page definitions, etc. In yet another embodiment, the definition of the custom object may include the relationship with the other custom object specifying the other custom format for metadata.

As an option, the definition of the custom object may include the aforementioned relationship(s) with the standard object/other custom object by including in the custom object a foreign key to the standard object/other custom object. As another option, the definition of the custom object may include the aforementioned relationship(s) with the standard object/other custom object by using a junction object having a reference to both the custom object and the standard object/other custom object. In this way, the relationship may be a one-to-many relationship.

As noted above, the definition is received at the database system from the first party. Such first party may be any party that is separate from the platform provider of the database system. In one embodiment, the first party may be a third-party developer using the database system (e.g. to develop applications). In another embodiment, where the database system is a multi-tenant on-demand database system (described in greater detail below), the first party may be a first tenant of the multi-tenant on-demand database system. For example, the first party may be a platform developer that is a first user of the database system. The platform developer may use a platform of the database system to define the custom object, in one embodiment. Such platform developer may therefore customize the metadata format specified by a particular custom object to be used in creating metadata.

As an option, in response to receipt of the definition of the custom object from the first party, additional information may be automatically included in the definition of the custom object (e.g. in accordance with predefined rules, etc.). Such additional information may be automatically included in the definition by the database system, in one embodiment. In another embodiment, the automatically included additional information may specify predetermined fields, such as a name field and a developer identifier field, as described in more detail below.

Additionally, as shown in operation 104, the custom object having the definition is stored. In one embodiment, the custom object may be stored in the database system. In another embodiment, the custom object may be stored in a manner that allows other users of the database system to access the custom object (e.g. to create metadata having reference to the custom object).

Further, as shown in operation 106, a first record is created by the first party or a second party according to the stored custom object which defines metadata according to the custom format. The first record may be a row in a table of a database, for example. Of course, however, the first record may be any structure created according to the stored custom object that defines metadata according to the custom format specified by the custom object.

In the exemplary embodiment described above where the custom object specifies the custom format of the metadata by specifying fields of the metadata, the first record may be created according to the custom format of the stored custom object by storing metadata (e.g. including values) for each of the fields specified by the custom object. In this way, the first record may be created to define metadata required by the custom object. As noted above, the first record may optionally be created according to the stored custom object by including in the record a reference to the stored custom object. As another option, the first record may be created according to the stored custom object using a user interface (e.g. of the database system) associated with the stored custom object.

As noted above, the first record is created by the first party or a second party. In the present description, the second party may be any party that is separate from the first party and the platform provider of the database system. In one embodiment where the first party is the third-party developer, the second party may be a user of code developed by the third-party developer. In another embodiment, where the database system is a multi-tenant on-demand database system, the second party may be a second tenant of the multi-tenant on-demand database system. In yet another embodiment, the second party may be an application developer that is a second user of the database system. The first party may use the custom object defined by the first party to develop an application, as described in more detail below.

In one embodiment, the first record may be created in response to a request to create the first record received from the first party or the second party. Such request may specify the metadata. In other embodiments, the request from the first party/second party may specify a first portion of the metadata, and a second portion of the metadata may be automatically specified for the first record (e.g. in accordance with the aforementioned predefined rules, for the predetermined fields, etc.).

Moreover, as shown in operation 108, the first record is related to a second record created according to the at least one of the standard object and the other custom object. The second record may therefore be metadata created according to the standard object and/or the other custom object. As an option, the first record may be related to the second record by the first party/second party by which the first record was created.

The first record may be related to the standard object and/or the other custom object based on the relationship included in the definition of the custom object. For example, the first record may be created to include the relationship as defined by the custom object. In one embodiment, a foreign key to the second record may be included in the first record. In another embodiment, a junction record created according to the aforementioned junction object may be created having a reference to both the first record and the second record.

Furthermore, in operation 110, at least one aspect of an application is defined, using the metadata of the first record and the relationship of the first record and the second record. In the present embodiment, the application may be any code (e.g. procedural code, declarative expressions, declarative validations, etc.) having one or more aspects that are capable of being defined using the metadata of the first record and the related second record. Thus, the metadata of the first record and the related second record may be used to customize, create, etc. the application. Thus, the application may not necessarily be a standalone business application, but may include procedural code with behaviors that are configurable using the metadata. For example, the application may be a toolkit of configurable behaviors.

In one embodiment, the application may be a graphical user interface, such as a form with fields for receiving input by a user. With respect to such embodiment, a component of the graphical user interface (e.g. entry field, button, etc.) may be defined using the metadata by including for such component a reference to the first record having the metadata. Such metadata may describe the content to be included in the component of the graphical user interface, for example.

To this end, the custom object defined in operation 102 may optionally relate to a component of a user interface, such as a visual component of the user interface. Such custom object may specify the custom format for the metadata to be defined for an instance of the component to be included in the application. The aspect of the application may accordingly implement the component of the user interface, for example, in accordance with the metadata of the first record formatted as specified by the custom object.

In another embodiment, the application may be a backend application without an interface for a user, such as an application executed by another application which may or may not be a graphical user interface. With respect to such other embodiment, a component of the backend application (e.g. algorithm, etc.) may be defined using the metadata by including for such component a reference to the first record having the metadata. Such metadata may describe the input to the component of the backend application, for example.

Further, the aspect of the application may be defined by the application developer, such as by referencing the first record. For example, the application developer, by providing the first record having the metadata which is related to standard metadata (e.g. also provided by the application developer), can create a functioning business application using the application (e.g. toolkit).

It should be noted that the aspect of the application that is defined using the metadata may be any portion of the application that is developed (e.g. coded, etc.) by the first party that defined the custom object. The second party may then specify the manner in which the aspect of the application executes by having the aspect of the application reference the first record, such that the metadata included therein can be used to control the manner in which the aspect of the application executes. Accordingly, the aspect of the application may be developed in a manner that defers some decisions to the metadata that the second party specifies. In particular, the custom object may allow the first party to write procedural code of the aspect of the application without necessarily knowing the specifics of the metadata it will use. Similarly, the custom object may allow the second party to customize the functionality of the aspect of the application by providing the first (i.e. metadata) record, without necessarily knowing, writing, etc. the procedural code.

In another embodiment, the aspect of the application may be developed by the first party and further defined (i.e. customized) by the first party using the metadata record. For example, the first party may use its own defined custom object to define the functionality of its own application. This may be the case, where for example a developer of an entity (e.g. tenant of multi-tenant on-demand database system) defines the custom object, and an administrator of that same entity creates the metadata according to the custom object.

Once the application is defined, including defining the aspect of the application using the metadata of the first record, the application may be published for execution thereof (e.g. by end users of the database system having access to the application, etc.). For example, in response to execution of the application by an end user of the database system, the first record may be retrieved (e.g. via the reference thereto) to provide the aspect of the application in accordance with the metadata of the first record.

As described in greater detail below, these custom objects can be utilized in custom formulas that may be supported through formula validation. More illustrative information will now be set forth regarding various optional architectures and features with which the foregoing framework may or may not be implemented, per the desires of the user. It should be noted that the following information is set forth for illustrative purposes and should not be construed as limiting in any manner. Any of the following features may be optionally incorporated with or without the exclusion of other features described.

Figure 2:
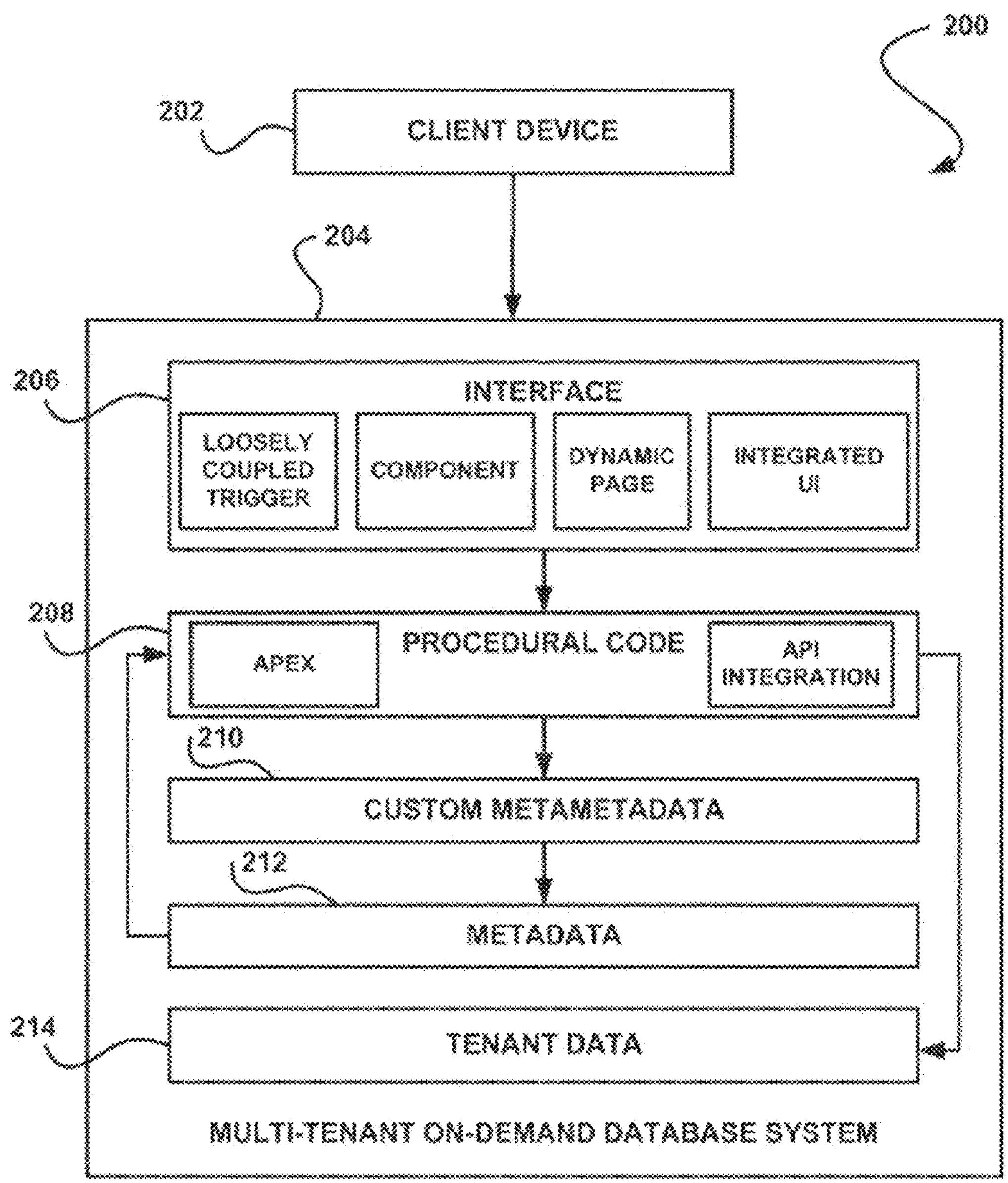
FIG. 2 illustrates one embodiment a system implementing metametadata objects.

FIG. 2 illustrates one embodiment a system implementing metametadata objects. As an option, the present system 200 may be implemented in the context of the technique 100 of FIG. 1. Of course, however, the system 200 may be implemented in any desired environment. It should also be noted that the aforementioned definitions may apply during the present description.

As shown, a client device 202 is in communication with a multi-tenant on-demand database system 204. The client device 202 may be any user computer capable of being used by a user to access the multi-tenant on-demand database system 204. Such multi-tenant on-demand database system 204 may be located on one or more servers accessible to the client device 202 via a network. It should be noted that while a multi-tenant on-demand database system 204 is described with reference to the present embodiment, the client device 202 may similarly be in communication with any database system.

The multi-tenant on-demand database system 204 includes an interface 206 for interfacing the client device 202 to various components of the multi-tenant on-demand database system 204. In one embodiment, the client device 202 may be used by a user to access the multi-tenant on-demand database system 204 for defining metametadata objects. In the context of the present embodiment, a metametadata object is an object specifying a custom format for metadata according to which a record having metadata is to be created (e.g. such as the object described above with respect to operation 102 of FIG. 1). The client device 202 may interact with a metametadata object creating application of the multi-tenant on-demand database system 204 for allowing the user thereof to define the metametadata object. Once defined, the metametadata object may be stored by the multi-tenant on-demand database system 204 as custom metametadata 210. In one embodiment, the user of the client device 202 may be a platform developer (or associated therewith) that is independent of a provider (e.g. creator) of the multi-tenant on-demand database system 204, who creates the metametadata object for extending the base platform provided by the provider of the multi-tenant on-demand database system 204.

The multi-tenant on-demand database system 204 also includes procedural code 208 for use in accessing tenant data 214 of the multi-tenant on-demand database system 204. The tenant data 214 may be any data that is specific to a tenant of the multi-tenant on-demand database system 204. Such tenant data 214 may optionally not be shared among other tenants of the multi-tenant on-demand database system 204, for example.

The procedural code 208 may be an application having at least one aspect that is capable of being defined by metadata 212 created in accordance with a metametadata object stored in the custom metametadata 210. Such metadata 212 may be created by an application developer of the multi-tenant on-demand database system 204, and used to configure an aspect of the application, whereas the metametadata object stored in the custom metametadata 210 may be created by the platform developer of the multi-tenant on-demand database system 204.

In one embodiment, the client device 202 may be used by a user to access the multi-tenant on-demand database system 204 for executing the application stored by the multi-tenant on-demand database system 204 in accordance with the metadata 212. Such application may be accessible to the client device 202 via the interface 206, for example. Upon execution of the application, a reference to the metadata 212 may be identified along with a dependency of the metadata 212 on the metametadata object stored in the custom metametadata 210. The procedural code 208 may execute, for the user of the client device 202, the application defined according to the metadata 212. Thus, the metametadata object may be used at runtime of the application such that the application is defined according to the metadata 212.

In one exemplary embodiment, a user performs an action or inserts data, and a hook activates the procedural code 208. The platform provider may provide both the hook and the procedural code 208. The procedural code 208 queries metadata 212 provided by an application developer to determine behavior appropriate to this case (e.g. namely which table the user is attempting to perform an operation on, or which page the user is currently viewing), such that the procedural code 208 uses the queried metadata 212, in addition to the relationship held by the metadata 212, to look up one or more specific metadata records which specify behavior for the application. In accordance with the determined behavior, the procedural code 208 writes results to the tenant data 214, and/or displays further user interface, fires an event such as an email, or sends a message via an integration, etc.

Returning to the validation issue discussed above, in some embodiments, looking up records in the metadata catalog based on EnumOrId representations is not directly possible. In one embodiment, in a metadata catalog table implementation that can be used for querying cached custom metadata, a method can be provided that accepts a custom metadata record object and returns an identifier based on a value that the record object refers to. In one embodiment, a "cache-like" instance of the custom metadata record object is utilized. In one embodiment, the "cache-like" instance is a wrapper for a custom metadata object.

This allows custom metadata relationships to be traversable relationships within a user interface, which allows formulas to be exposed and saved correctly.

Figure 3:
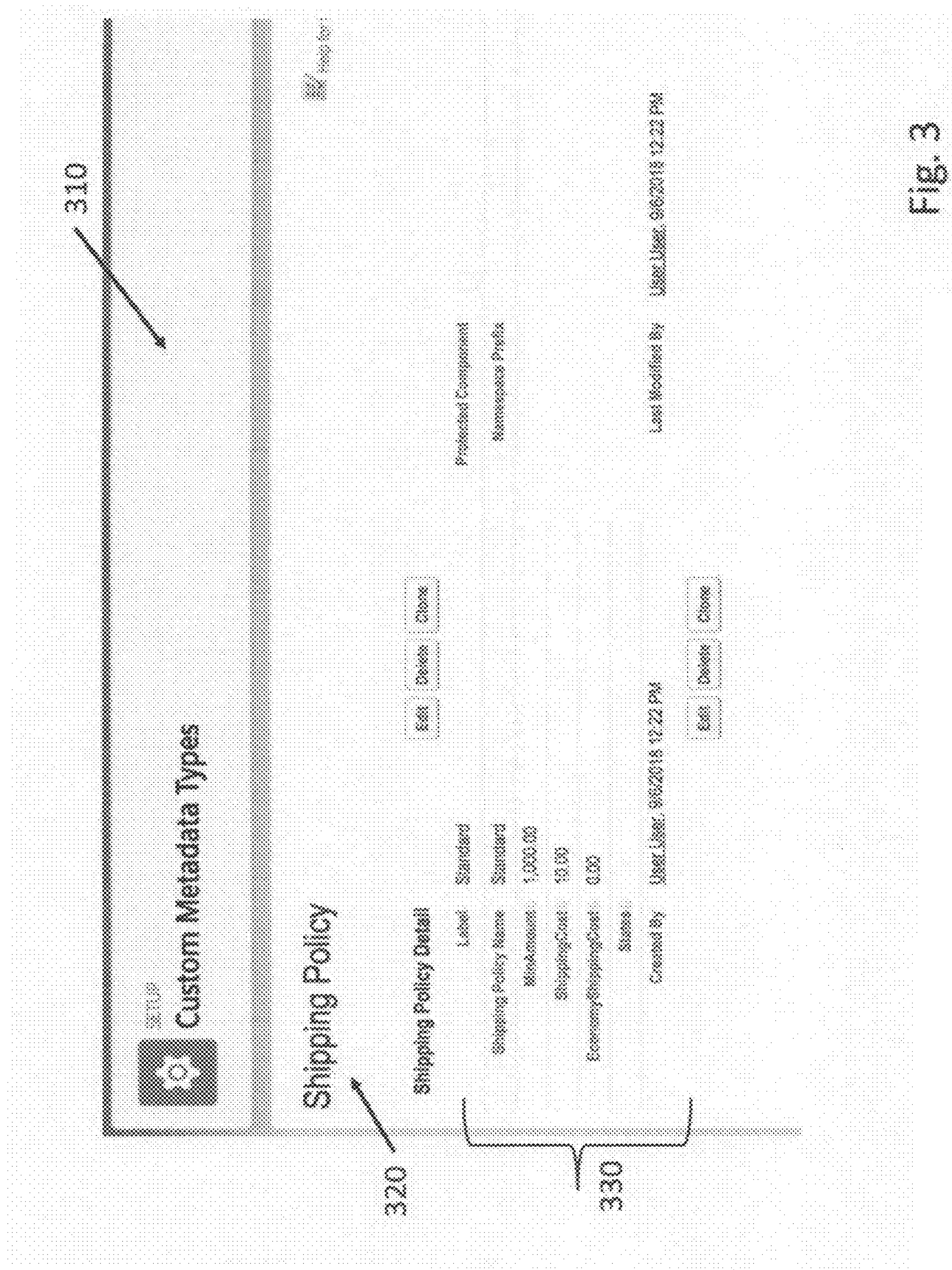
FIG. 3 is an example user interface in which a user can create a custom metadata record that one or more formulas can reference.

FIG. 3 is an example user interface in which a user can create a custom metadata record that one or more formulas can reference. In the example of FIG. 3, a custom metadata type can be set up using setup interface 310. The example of FIG. 3 is for a shipping policy (320) custom metadata type. In various embodiments, custom metadata types can have one or more associated custom fields, 330. As described in greater detail below, one or more of custom fields 330 can be a metadata relationship field that can support validation formulas on custom metadata types. Custom metadata setup interface 310 can also include different and/or additional fields and functionality.

Figure 4:
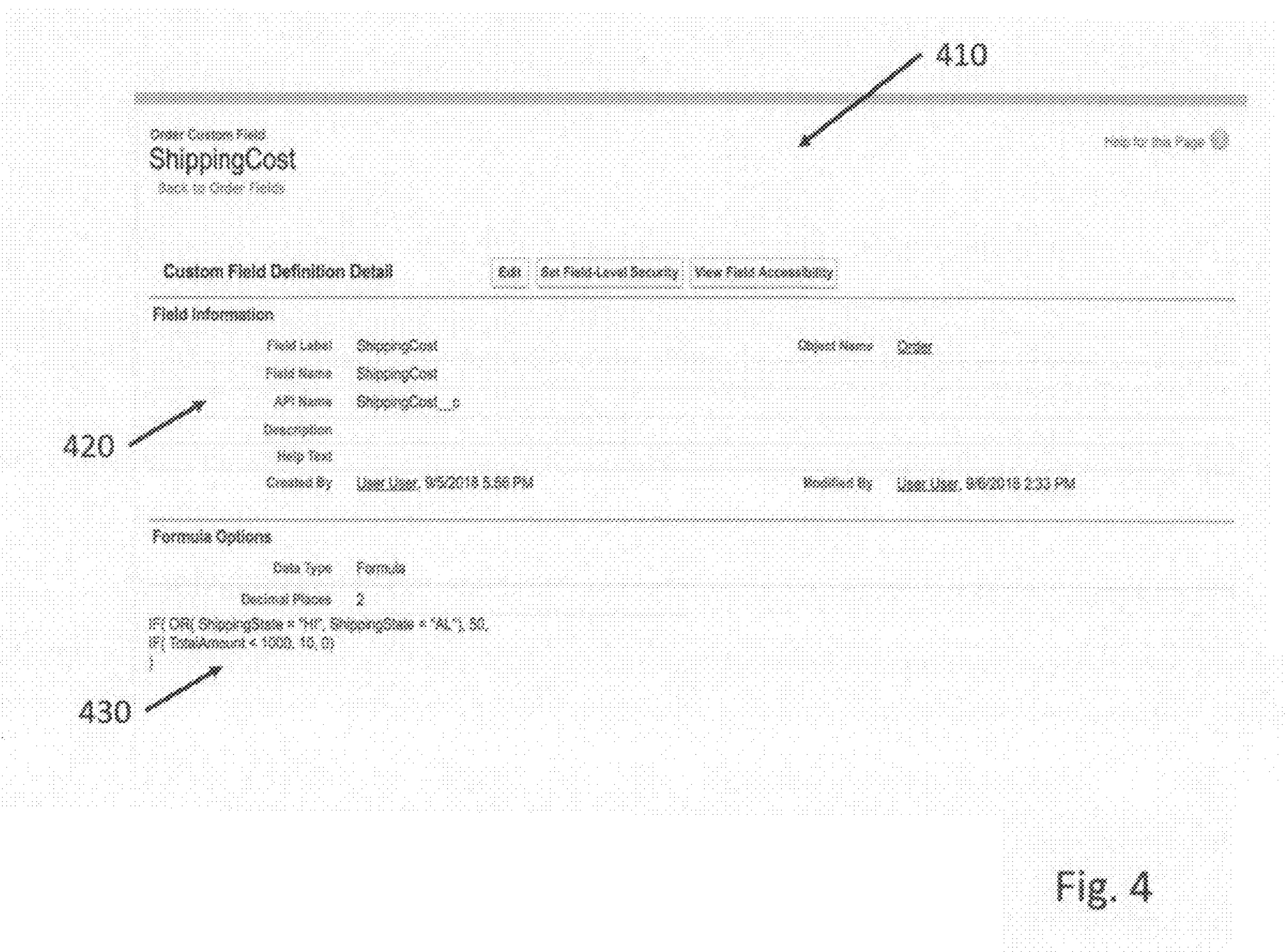
FIG. 4 is an example user interface in which a user can create a formula for use in a standard object.

FIG. 4 is an example user interface in which a user can create a formula for use in a standard object. The example of FIG. 4 refers to shipping cost custom field interface 410, which provides customization for one of custom fields 330 (e.g., shipping policy custom metadata type 320). In one embodiment, various field information 420 (e.g., Field Label, Field Name, API Name, Description, Help Text, Created By) that can be edited and/or added to.

In one embodiment, custom field interface 410 can include a formula section (430) that allows validation formulas (and other formulas as well) to be used with the custom objects and fields being configured. In the example of FIG. 4, the formula can be utilized to determine the value in the custom Shipping Cost field (being set up and managed with interface 410). While this example is related to shipping costs, any type of field that is to be verified can be handled in a similar manner.

In the example of FIG. 4, the formula:

```
IF(OR(ShippingState = "HI", ShippingState = "AL"), 50,
IF(TotalAmount < 1000, 10, 0)
)
```

Can be utilized to use a shipping cost of 50 to Hawaii or Alaska and a shipping cost of 0 if a total amount is less than 1000 or a shipping cost of 10 if the amount is less than 1000. Note that this formula requires hard coding to provide values and does not utilize custom metadata type objects.

Figure 5:
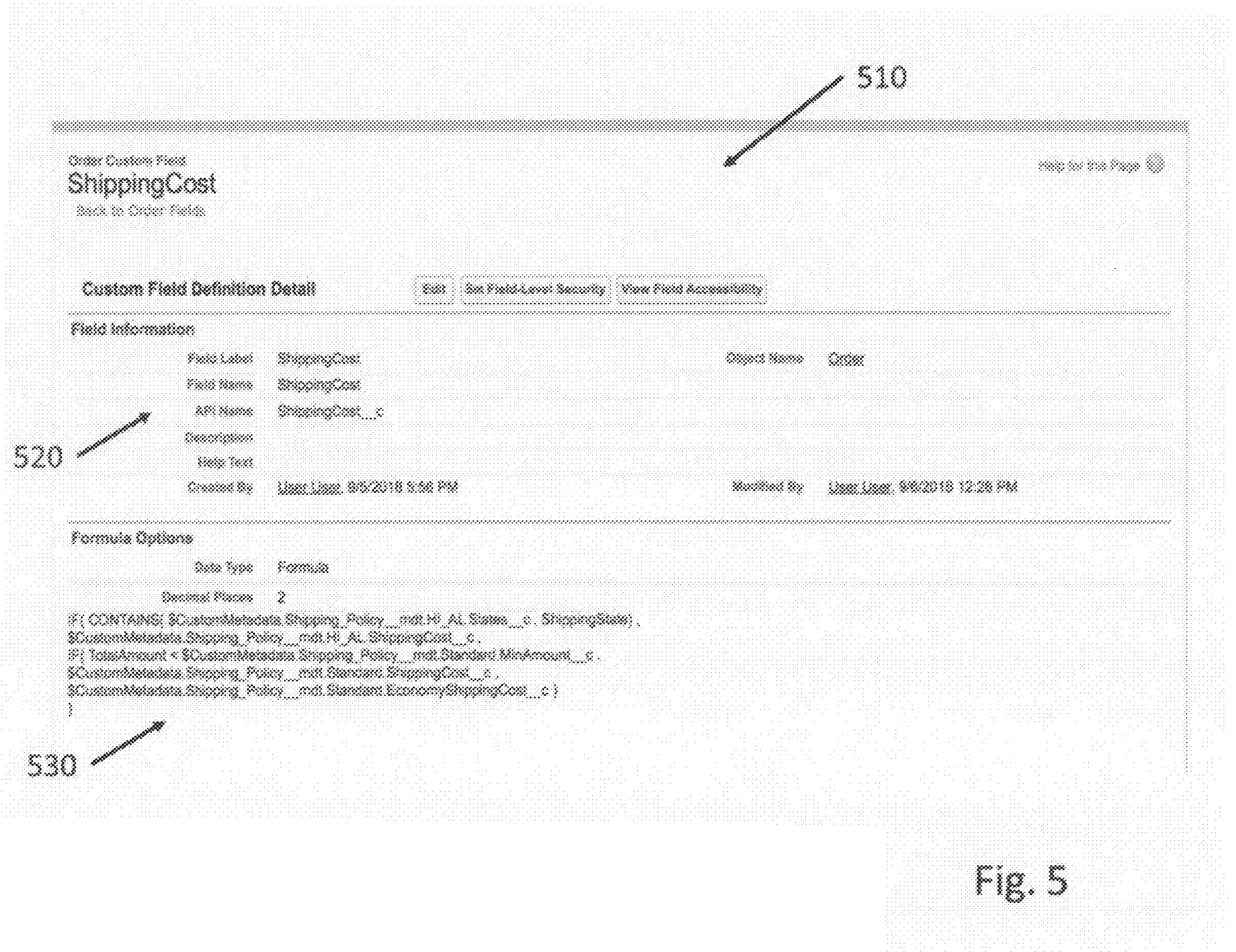
FIG. 5 is an example user interface in which a user can create a formula referencing a custom metadata record.

FIG. 5 is an example user interface in which a user can create a formula referencing a custom metadata record. The example of FIG. 5 refers to shipping cost custom field interface 510, which provides customization for one of custom fields 330 (e.g., shipping policy custom metadata type 320). In one embodiment, various field information 520 (e.g., Field Label, Field Name, API Name, Description, Help Text, Created By) that can be edited and/or added to.

In one embodiment, custom field interface 510 can include a formula section (530) that allows validation formulas (and other formulas as well) to be used with the custom objects and fields being configured. In the example of FIG. 5, the formula can be utilized to determine whether the value in the custom Shipping Cost field (being set up and managed with interface 510) is within the correct range. However, in the example of FIG. 5, the formula can reference custom metadata type objects, which can support formulas that do not require the coding as with the formula of FIG. 4.

In the example of FIG. 5, the following formula can be utilized:

```
IF(CONTAINS($CustomMetadata.Shipping_Policy_—mdt.HI_AL.States_—c,
ShippingState),
$CustomMetadata.Shipping_Policy_—mdt.HI_AL.ShippingCost_—c,
IF(TotalAmount <
$CustomMetadata.Shipping_Policy_—mdt.Standard.MinAmount_—c,
$CustomMetadata.Shipping_Policy_—mdt.Standard.ShippingCost_—c,
$CustomMetadata.Shipping_Policy_—mdt.Standard.EconomyShippingCos
t_—c)
)
```

Thus, various values (e.g., shipping policy for one or more specified states, minimum transaction amount, minimum shipping charge, standard shipping charge) can be changed without the need to change the formula for the shipping cost field.

Figure 6:
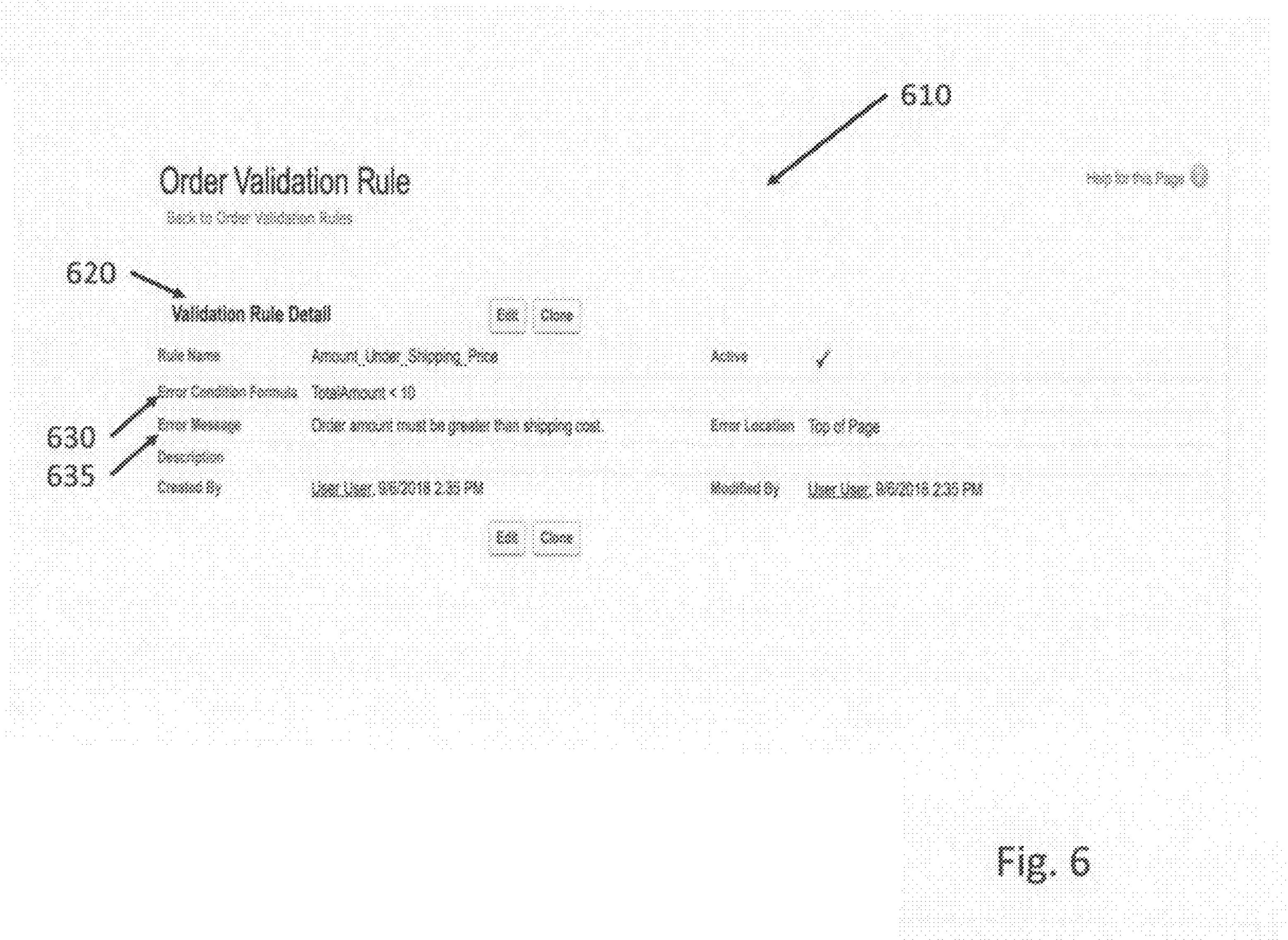
FIG. 6 is an example user interface in which a user can create a formula referencing a custom metadata record that cannot be validated as described herein.

FIG. 6 is an example user interface in which a user can create a formula referencing a custom metadata record that cannot be validated as described herein. In one embodiment, order validation rule interface 610 that can allow editing and/or management of one or more rules. In one embodiment, error condition value field 630 can have an error condition, (e.g., TotalAmount <10) and if the error condition exists, an error message is displayed, 635, (e.g., "Order amount must be greater than shipping cost."). Similar to the example of FIG. 4, error condition 630 and error message 635 are programmed in interface 610.

Figure 7:
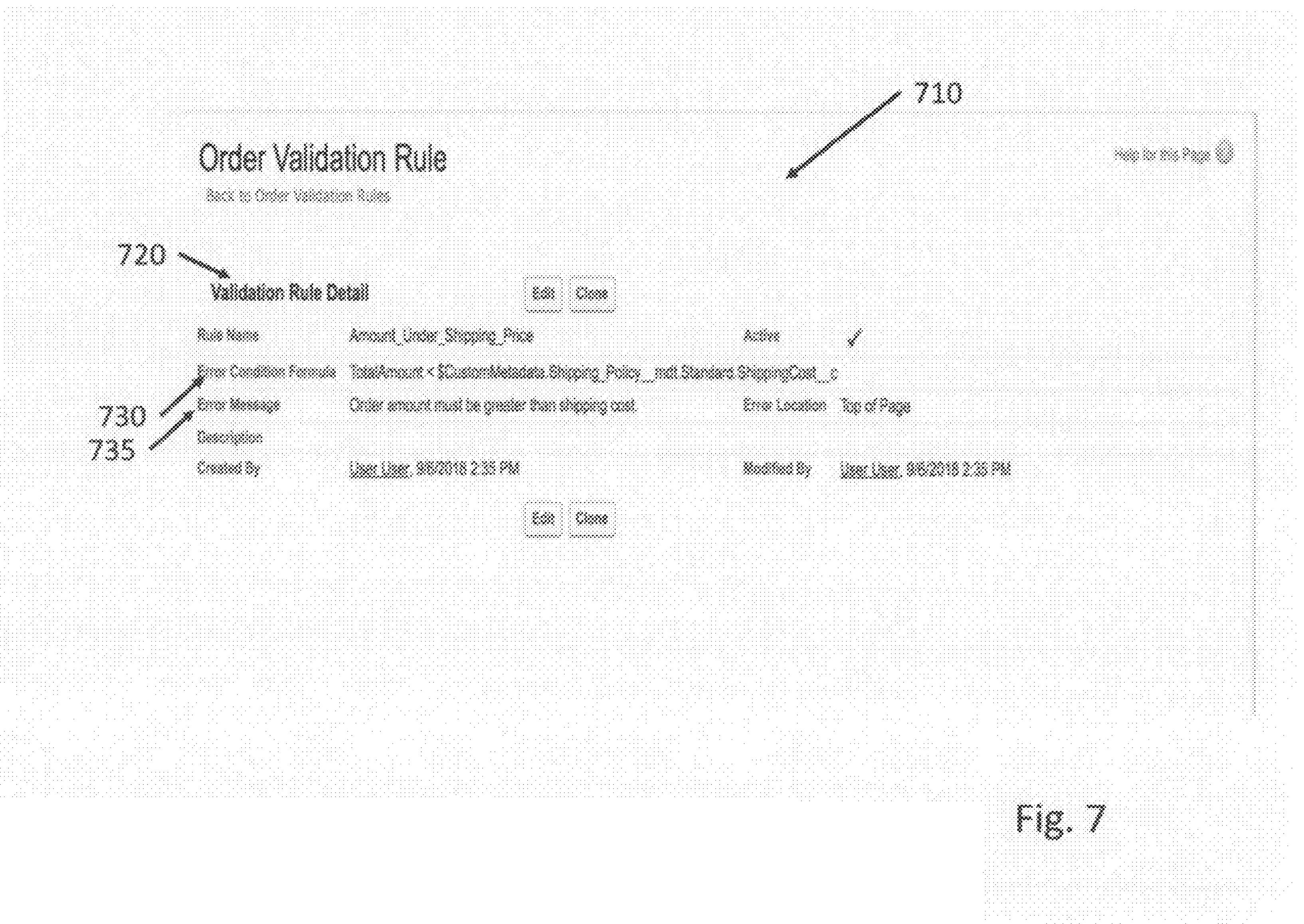
FIG. 7 is an example user interface in which a user can create a formula referencing a custom metadata record that can be validated as described herein.

FIG. 7 is an example user interface in which a user can create a formula referencing a custom metadata record that can be validated as described herein. In one embodiment, order validation rule interface 710 that can allow editing and/or management of one or more rules. In one embodiment, error condition formula field 730 can have an error formula, (e.g., "TotalAmount<$CustomMetadata.Shipping_Policy_mdt.Standard.ShippingCost_c") and if the error condition exists, an error message is displayed, 735, (e.g., "Order amount must be greater than shipping cost."). In the example of FIG. 7, the error condition formula can be provided in terms of a custom metadata object.

In some embodiments, not illustrated in FIG. 7, error message field 735 can reference a custom metadata type object. In additional alternative embodiments, other fields (any number of fields) can reference a custom metadata type object.

Figure 8:
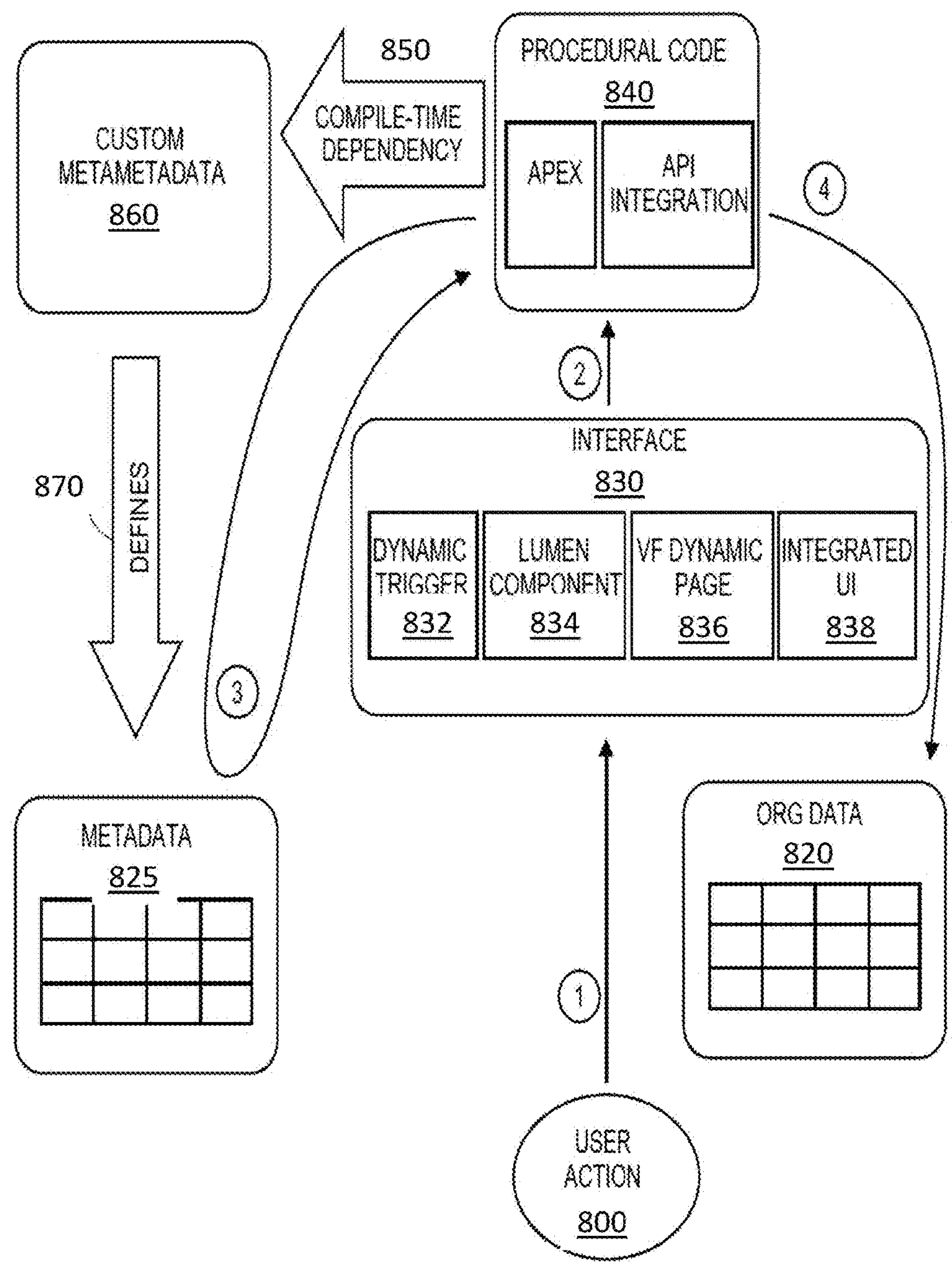
FIG. 8 is a conceptual diagram of one embodiment of an interrelation of declarative platform features that can provide custom metadata functionality.

In various embodiments, the custom metadata object functionality as described herein can be provided as declarative platform features. FIG. 8 is a conceptual diagram of one embodiment of an interrelation of declarative platform features that can provide custom metadata functionality. In one embodiment, the diagram of FIG. 8 illustrates what platform-on-the-platform (PotP) providers provide to deliver a declarative platform features to support custom metadata functionality as described herein.

In one embodiment, in response to user action 800, the custom metadata functionality is provided. User action 800, can be, for example, a user action through a graphical user interface (GUI), or a user may provide/insert data in another manner. Alternatively, the custom metadata functionality can be activated through, for example, a time-based workflow, an inbound web service call, or other non-user initiated action.

In the example of FIG. 8, organization data 820 and metadata 825 are provided by an organization or application within the multi-tenant database environment. That is organization data 820 and metadata 825 belong to the organization to which the user belongs. Also, in the example of FIG. 8, interface 830, procedural code 840 and custom metametadata 860 are provided by a platform developer and/or the multi-tenant database environment.

In one embodiment, interface 830 includes a hook of some type that is enabled by standard multi-tenant database functionality. In one embodiment, this hook activates flexible procedural code 840. In one embodiment, the platform provider can provide both the hook and the code. In one embodiment, interface 830 includes dynamic trigger 832, which can operate as the hook described above to activate some or all of procedural code 840.

In some embodiments, user interface components may be provided using technologies and formats that are widely used for the organization and display of information, such as HTML, Java®, JavaScript®, Cascading Style Sheets (CSS), Adobe® PDF, or DOC format. Alternately, or additionally, user interface components may be provided using proprietary technologies and formats that are made available by the provider of an on-demand service environment, such as the Lumen™, Apex™, and VisualForce™ (VF) technologies available from Salesforce.com® of San Francisco, Calif. These technologies can be used to provide, for example, Lumen component 834 and/or VF dynamic page 836.

In one embodiment, procedural code 840 operates to query metadata 825 provided by the consuming organization/application to determine the appropriate behavior for the corresponding trigger. In response to the metadata retrieved from the query, procedural code 840 operates to write results to organization data 820. Procedural code 840 may also provide UI displays, trigger an event (e.g., email notification, SMS message etc.

In one embodiment, procedural code 840 utilizes compile time dependencies 850 to generate custom metametadata 860, which is maintained by the platform developer. Custom metametadata 860 can be provided, via defines 870, to metadata 825, which is maintained by the consuming organization/application.

These new types of metadata can be referred to as custom setup objects. Records for the custom setup objects are metadata. Custom metametadata may be useful for platform-on-the-platform development. In one embodiment, custom setup object records can be editable through procedural code 840 and readable through external data interfaces. Using an example from the Salesforce.com® multi-tenant database environment the custom setup object records are editable through the Metadata interface and are read-only through the External data interface. In other multi-tenant environments, different interfaces can be utilized.

Continuing the salesforce.com example, allowing custom platform object record accesses through the Metadata interface is more complex than allowing standard Setup record accesses. Because customers/partners can create custom setup objects, each individual custom setup object cannot be included in the Metadata Web Service Definition Language (WSDL) code. In one embodiment, an NVP model for a custom setup object can be used:

```
<CustomSetupObjectRecord
    type="platVendorNs.PlatVendorsCustomSetupObject_—c"
    developerName="appVendorNs.AppVendorsCustomSetupObjectRecord">
  <FieldValue
        field="platVendorNs.PlatVendorsCustomSetupObject_—c.PlatVendorsField1_—
c"
        value="OurValue" />
  <FieldValue
        field="platVendorNs.PlatVendorsCustomSetupObject_—c.PlatVendorsField2_—
c"
        value="5" />
</CustomSetupObjectRecord>
```

In this embodiment, a single WSDL example, is sufficient for the record (a record has a type and a name and in contains FieldValue elements with a field name and a value).

In one embodiment, continuing with the salesforce.com environment example, if custom setup object records are metadata, then they can be accessible (in one embodiment, both readable and writable) through the Metadata interface. This is useful for de developer tools and is an effective packaging capability. By enabling platform-on-the-platform development, a new form of collaboration between independent platform vendors and independent application vendors can be supported.

In one embodiment, independent platform vendors can provide the custom setup objects that their procedural code consumes, but independent application vendors, in order to use the platform's features, create records for the custom setup objects. In one embodiment, in order to package the application, these records are packages and are accessible through the Metadata interface.

In one embodiment, custom setup object records are readable through external data interfaces. In one embodiment, during runtime (as illustrated in FIG. 8, for example), custom setup object behavior is implemented through data interfaces. In the salesforce.com example, this can be done directly or through Apex™, rather than the Metadata interface, so to use custom setup object records the data interfaces must be able to access the custom setup object records.

In one embodiment, in order to keep a clear metadata/data split, which can be important for things like editability for managed statistics, customers and/or partners are not allowed to use the standard data interface to insert, update or delete these records because the records are not data; they are metadata. In one embodiment, custom setup object records are editable through internal versions of the data interface.

The examples below are a few examples of situations in which custom metametadata can be utilized. The examples herein are not intended to be exhaustive because the metametadata mechanisms described herein are powerful and flexible and have wide application.

An ISV (or other entity) can provide a custom setup object to implement a universal picklist and a junction object linking the picklist to particular fields, which can be, for example, text fields, number fields, etc. The ISV could, for example, provide a Lumen component that, rather than displaying these fields as text fields in the UI, would create a dropdown list with appropriate options.

An ISV (or other entity) can provide a custom setup object to implement a page layout with child custom setup object to represent each layout item (and its attendant rules) and use a Lumen application or dynamic VF page (which consults the setup object records) to display the page at runtime. A similar custom setup object-based layout could include fields from related objects.

Intelligent related lists can be provided as custom setup objects that refer to particular foreign key fields on the child object to distinguish between different relationships. These lists can be rendered using a VF or Lumen component. The previous examples are just a few of the possibilities that custom metametadata can be utilized to provide.

In various embodiments, the functionality described herein can be provided in an on-demand services environment. In some embodiments, the on-demand services environment includes a multitenant database environment. Example embodiments are provided below.

Figure 9:
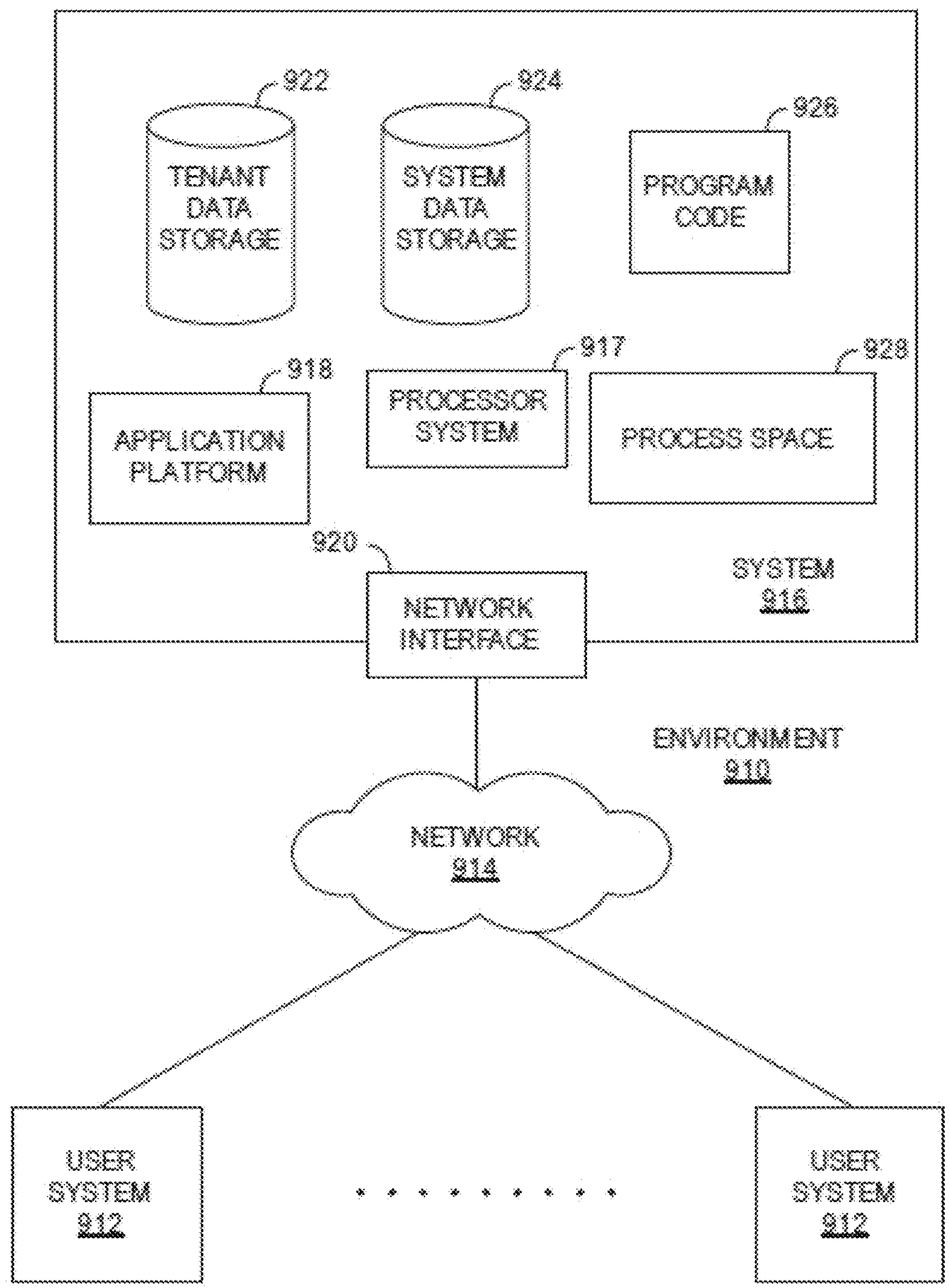
FIG. 9 illustrates a block diagram of an environment where an on-demand database service might be used.

FIG. 9 illustrates a block diagram of an environment 910 wherein an on-demand database service might be used. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in herein FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Core series processor or the like. Similarly, system 916 (and additional instances of an MTS, where more than one is present) and all of their components might be operator configurable using application(s) including computer code to run using a central processing unit such as processor system 917, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
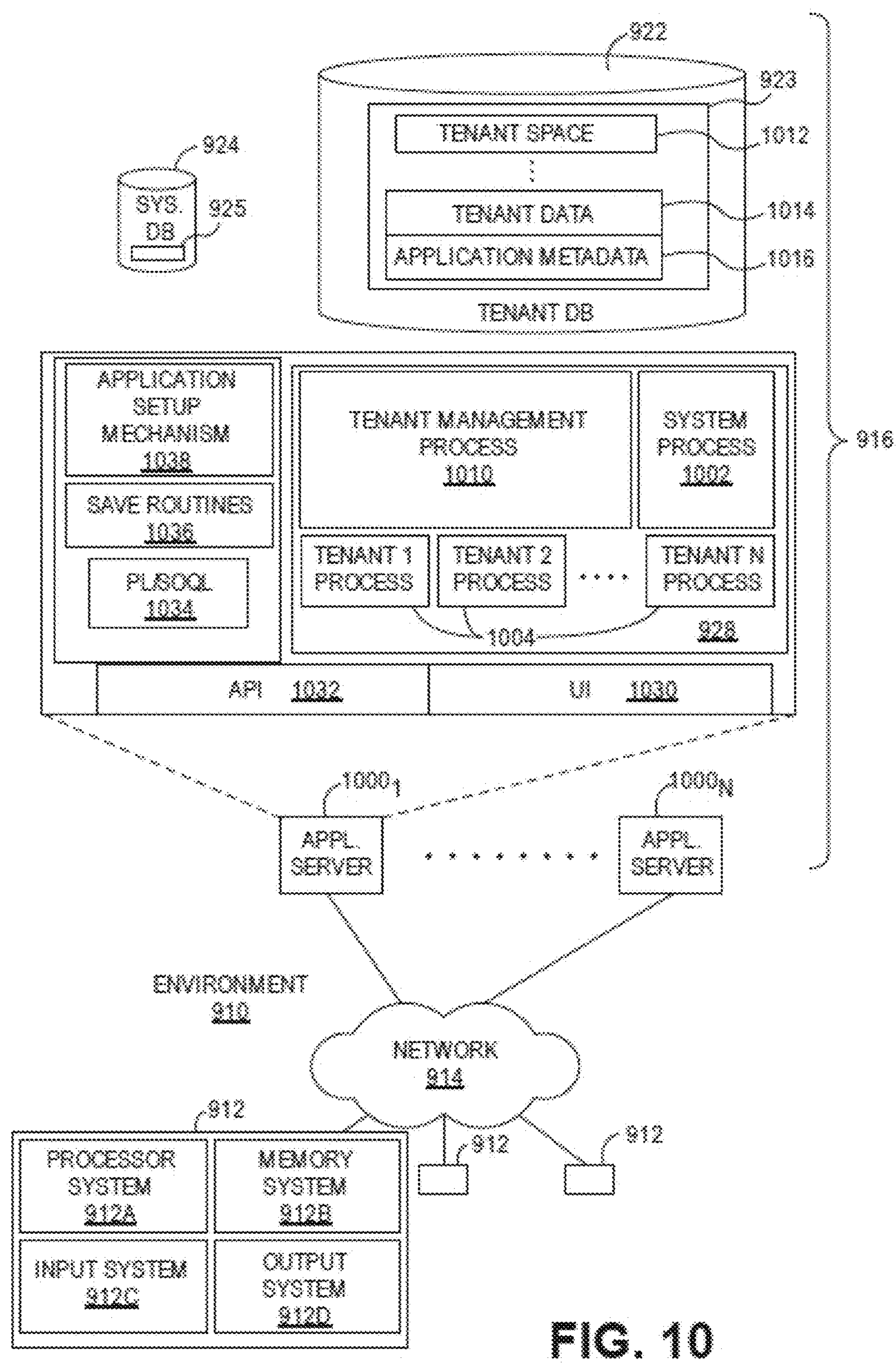
FIG. 10 illustrates a block diagram of another environment where an on-demand database service might be used.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $\mathbf{1000}_1$-$\mathbf{1000}_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $\mathbf{1000}_1$ might be coupled via the network 914 (e.g., the Internet), another application server $\mathbf{1000}_{N-1}$ might be coupled via a direct network link, and another application server $\mathbf{1000}_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 BIG-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processors, are configurable to cause the one or more processors to:

receive, within a database system provided by the one or more processors, a definition of a custom object specifying a custom format for metadata, wherein creation of the metadata is required to comply with the custom format specified within the custom object with the metadata is associated with the custom object, and further wherein at least a portion of the metadata refers to another custom metadata object type;

customize the metadata format specified by a particular custom object to be used in creating metadata;

store the custom object having the definition within the database system;

create a database record utilizing the custom object having the associated metadata that references another custom metadata object type; and define at least one aspect of an application utilizing the database system using the metadata associated with the custom object utilized in the created database record, wherein the reference to the another custom metadata object type is within a formula field that do not require hard coding as with the formula.

2. The non-transitory computer-readable medium of claim 1 wherein the database system comprises a multitenant database system.

3. The non-transitory computer-readable medium of claim 1 wherein the at least one aspect of the application comprises at least a graphical object on a graphical user interface communicatively coupled with the database system.

4. The non-transitory computer-readable medium of claim 1 wherein the reference to the another custom metadata object type is within a validation formula.

5. The non-transitory computer-readable medium of claim 1 wherein the reference to the another custom metadata object type is within an error formula.

6. A system comprising:

a memory system comprising one or more memory devices;

one or more processors coupled with the memory system, the one or more processors configurable to:

receive, within a database system provided by the one or more processors, a definition of a custom object specifying a custom format for metadata, wherein creation of the metadata is required to comply with the custom format specified within the custom object with the metadata is associated with the custom object, and further wherein at least a portion of the metadata refers to another custom metadata object type, customize the metadata format specified by a particular custom object to be used in creating metadata, store the custom object having the definition within the database system, create a database record utilizing the custom object having the associated metadata that references another custom metadata object type, and define at least one aspect of an application utilizing the database system using the metadata associated with the custom object utilized in the created database record, wherein the reference to the another custom metadata object type is within a formula field that do not require hard coding as with the formula.

7. The system of claim 6 wherein the database system comprises a multitenant database system.

8. The system of claim 6 wherein the at least one aspect of the application comprises at least a graphical object on a graphical user interface communicatively coupled with the database system.

9. The system of claim 6 wherein the reference to the another custom metadata object type is within a validation formula.

10. The system of claim 6 wherein the reference to the another custom metadata object type is within an error formula.

11. A method comprising:

receiving, within a database system provided by the one or more processors, a definition of a custom object specifying a custom format for metadata, wherein creation of the metadata is required to comply with the custom format specified within the custom object with the metadata is associated with the custom object, and further wherein at least a portion of the metadata refers to another custom metadata object type;

customizing the metadata format specified by a particular custom object to be used in creating metadata;

storing the custom object having the definition within the database system;

creating a database record utilizing the custom object having the associated metadata that references another custom metadata object type; and defining at least one aspect of an application utilizing the database system using the metadata associated with the custom object utilized in the created database record, wherein the reference to the another custom metadata object type is within a formula field that do not require hard coding as with the formula.

12. The method of claim 11 wherein the database system comprises a multitenant database system.

13. The method of claim 11 wherein the at least one aspect of the application comprises at least a graphical object on a graphical user interface communicatively coupled with the database system.

14. The method of claim 13 wherein the reference to the another custom metadata object type is within a validation formula.

15. The method of claim 11 wherein the reference to the another custom metadata object type is within an error condition.

* * * * *